Patented Dec. 2, 1952

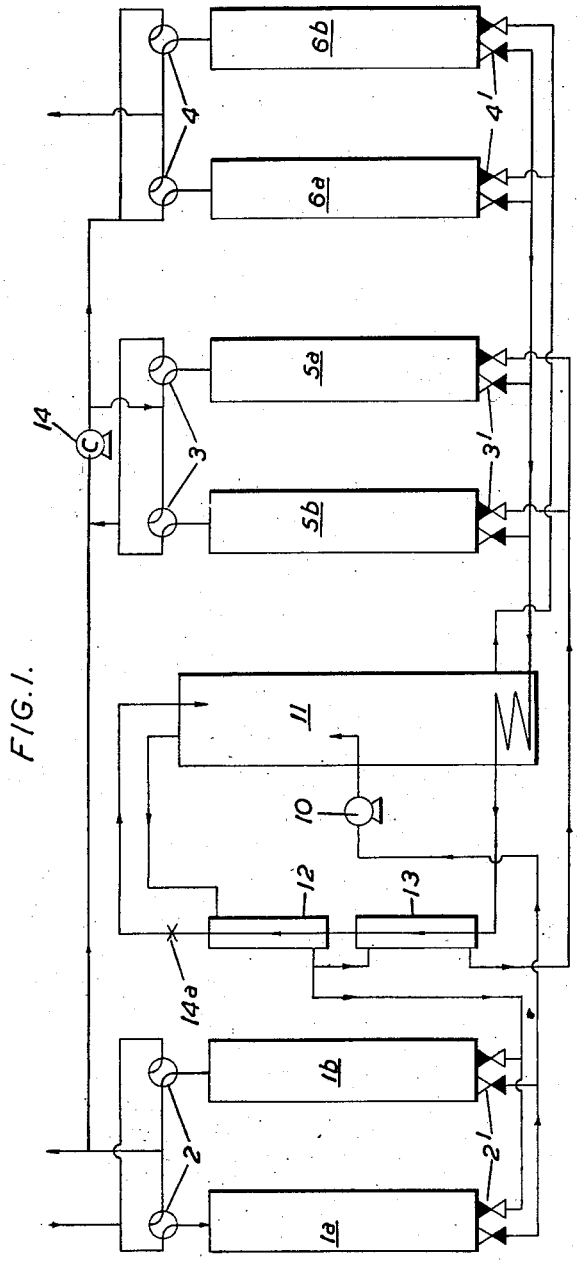

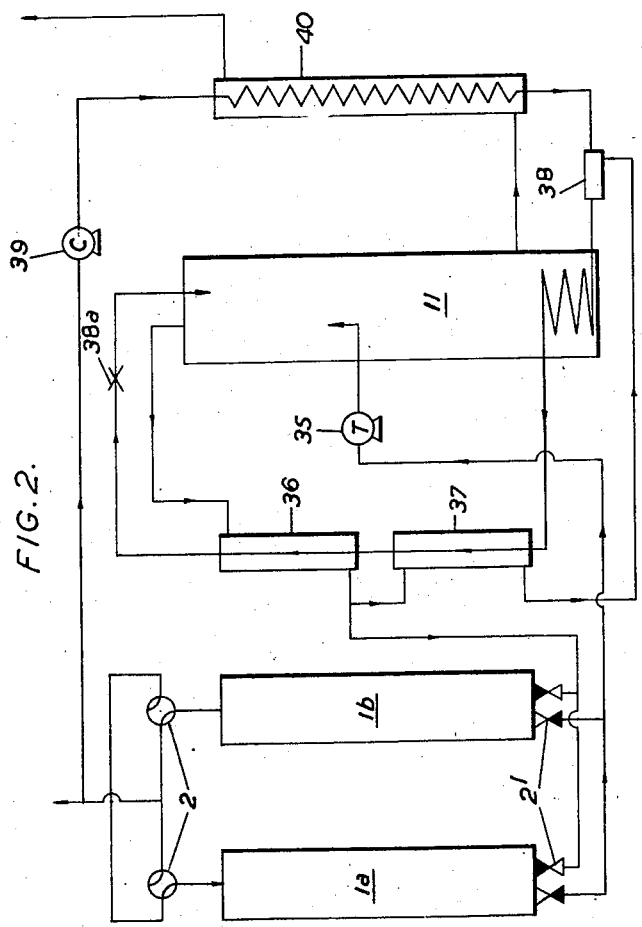

2,619,813

UNITED STATES PATENT OFFICE 2,619,813

SEPARATION OF GAS MIXTURES

Paul Maurice Schuftan, Richmond Hill, and Neville Wyn Roberts, West Wimbledon, London, England, assignors to The British Oxygen Company, London, England, a British company Application May 1, 1948, Serial No. 24,538
In Great Britain May 14, 1947

1 Claim. (Cl. 62—175.5)

The present invention relates to the separation of gas mixtures, and more particularly to those gas mixtures which are capable of giving a homogeneous liquid phase on cooling and of being separated into two or more fractions of different boiling points. Typical of such a gaseous mixture is air, and to facilitate an appreciation of the invention herein to be described particular reference will be made to air separation.

It is known that air separation can be carried out in a single column, in the base of which compressed air is liquefied by indirect heat exchange, the liquefied air thus produced being expanded in a valve and fed into the top of the column for use as reflux. The vapour in equilibrium with liquid air contains about 6.5% oxygen so that oxygen is the only constituent of the atmosphere which can be extracted in a substantially pure form by rectification in a single column. A substantial proportion of the oxygen leaves the top of the column with the nitrogen and represents such a material loss in yield that a single column is rarely used under commercial conditions for the production of oxygen.

These difficulties can be overcome by the use of the well known double column. In this device substantially pure liquid nitrogen is withdrawn from a lower column in which the air is partially rectified under a pressure of about 5 atmospheres, the remainder of the air being withdrawn at the base of the lower column in the form of a liquid containing approximately 30–40% oxygen. These liquids are fed into the appropriate points in the upper column where the rectification is completed, giving substantially pure oxygen and nitrogen. Double column separation suffers, however, from several disadvantages. The column is of considerable height and requires to be housed in a tall building and, by reason of its height, cold losses by radiation and convection are substantial. An additional disadvantage is that when producing substantially pure oxygen, at least 80% of the air must be compressed to a pressure of at least 5.5 atmospheres absolute; further, the amount of reflux available is limited and, especially when producing liquid oxygen, is barely sufficient to produce nitrogen of the requisite quantity and purity in the lower column. Moreover, when a fraction enriched in one or more of the rare gases is to be recovered the purity of one or other of the main products is adversely affected.

An important advance in the technique of gas separation, especially for large scale operation, was the introduction of alternating heat exchangers wherein periodically reversed regenerators or reversible exchangers are employed for cooling the compressed gas mixture. Cooling in alternating heat exchangers possesses the important advantage that prepurification of the gas mixture is unnecessary but has hitherto suffered from the disadvantage that both the product streams are contaminated with the gas mixure present in the exchangers at the time of the changeover. In the case of air separation, to avoid contamination of the oxygen fraction, it has been proposed to use a single pair of regenerators in association with a single column and to return only the nitrogen fraction through the regenerators, the cold in the separated oxygen fraction being recovered by passing the fraction through a tubular exchanger in counter-current to a stream of compressed air which is then introduced into the base of the column.

In accordance with the present invention, there is provided a method of separating the constituents of a gas mixture into a lower boiling point fraction and a higher boiling point fraction which comprises compressing the mixture, cooling the compressed mixture in alternating heat exchangers, conditioning the cooling compressed mixture to form a saturated vapour containing the major part of the higher boiling point fraction, feeding such vapour to a single rectification column and using at least a part of the separated lower boiling point fraction for boiling and reflux in the column.

The term "major part" as used herein is intended to mean at least 50% and is specifically intended to cover the case in which the whole of the high boiling point constituents are fed to the column as vapour.

In one method of carrying the invention into effect the conditioning of the compressed mixture emerging from the alternating heat exchangers involves isentropic expansion.

In another method the conditioning of the cooled compressed mixture emerging from the alternating heat exchangers is carried out in an "enricher." Conditioning in the enricher may be followed by isentropic expansion.

By "enricher" is meant an apparatus for effecting partial condensation of the mixture by indirect heat transfer to the condensate formed in the apparatus which condensate is evaporated at a lower pressure than that of the condensing mixture wherein the mixture is constrained to traverse the apparatus upwardly in countercurrent to and in direct contact with the condensate formed, and in counter-current to and in indirect contact with the evaporating condensate and wherein the evaporating condensate is flowing in co-current with the vapour formed during its evaporation.

The mixture fed to the enricher may be at such a pressure that the lower boiling point fraction produced therein will, whilst serving as the boiling medium in the base of the column, be condensed by heat exchange with the higher boiling point fraction.

Alternatively the pressure of the lower boiling point fraction withdrawn from the enricher may be raised to such a value that the lower boiling point fraction is condensed at the base of the column by indirect heat transfer to the higher boiling point fraction therein.

The proportion of the lower boiling point fraction which is used as the reflux medium in the column may be derived at least in part from the separated lower boiling point fraction either wholly before it returns to the alternating heat exchanger when the fraction is at a low temperature, or wholly after the fraction has traversed the exchanger when it will be at substantially atmospheric temperature, or a part may be derived from such fraction before entering the exchanger and the remainder from such fraction after it has traversed the exchanger. If in the warm state, the gas may be compressed by a suitable single- or multi-stage gas compressor, or if in the cold state may be compressed by a rotary compressor such as a turbo-compressor or axial flow compressor capable of operating with fluids at temperatures in the region of the liquefaction point of the lower boiling point fraction. If a stream of warm gas is available, the cold gas can be compressed by a jet pump capable of working at temperatures in the region of the liquefaction point of the lower boiling point fraction, the warm gas serving in such case as the operating fluid for the pump. The warm gas can be made available either by diverting for this purpose a part of the low boiling point fraction emerging from the alternating heat exchanger at substantially atmospheric temperature, or by passing a portion of the cold separated low boiling point fraction through a special heater.

In cases where the lower boiling point fraction which is to be compressed for use as reflux is at least in part withdrawn from the stream of separated lower boiling point fraction leaving the alternating heat exchanger containing condensates deposited in the previous cycle, it has been found that in view of the difference in actual volumes between the compressed gas mixture fed thereto and the lower boiling point fraction returning thereto substantially the whole of the condensates in the alternating heat exchangers will have been revaporised by the lower boiling point fraction well before the end of the cycle. The lower boiling point fraction leaving the exchanger during the concluding part of the cycle will in consequence be substantially free from re-vaporised condensates and advantage can be taken of this phenomenon to use for reflux this relatively pure tail portion of the lower boiling point fraction. The cooling of this tail portion can then be effected with advantage in a continuous exchanger without risk of early blockage by accumulation of revaporised condensates of relatively high freezing point.

Where the process is applied to air separation, as more particularly described hereinafter, it will in no instance be necessary to compress the air to a pressure exceeding about 6 atmospheres absolute except in special instances which will be referred later. A pressure as high as this is needed only for a part of the air in the particular case in which the nitrogen from the enricher is passed directly to the base of the column. In the other cases the air has to be compressed to a pressure of about 2.6 atmospheres absolute only. It will, however, be necessary to produce sufficient cold to compensate losses to the surroundings and the unavoidable heat exchange losses.

Cold may be produced, for example, by compressing a supplementary amount of air to a pressure substantially higher than 6 atmospheres and after removal of the heat of compression, this air is expanded either isentropically or isenthalpically or both, the final air pressure being such that the expanded air can be treated in the process as described. For example, the air may be expanded substantially to atmospheric pressure so that it can be fed direct to the column, or it may be expanded to an intermediate pressure not exceeding 6 atmospheres absolute and either fed to the enricher or used as supplementary reboiling medium in the column.

In another method of producing cold the nitrogen which is to be used for reflux purposes is compressed to a greater pressure than 6 atmospheres and after removal of the heat of compression this nitrogen is expanded either isentropically or isenthalpically, or both, to a final pressure of 6 atmospheres absolute.

Alternatively cold can be produced by compressing a part of the air, to a pressure not exceeding 6 atmospheres absolute, cooling the compressed air in one pair of alternating heat exchangers, introducing the cooled compressed air into the enricher and isentropically expanding the oxygen fraction leaving the enricher before it is fed to the column, the remainder of the air being compressed only to about 2.6 atmospheres absolute, cooled in another pair of alternating heat exchangers and isentropically expanded before being fed to the column.

The foregoing description has been largely devoted to the separation of air but it will be appreciated that the process can be used to separate other gas mixtures such, for example, as hydrocarbon gas mixtures which on cooling give an homogeneous liquid phase.

The term "isentropic expansion" as used herein implies expansion in a machine with recovery of external work and production of cold and is to be understood to include the entropy increase inevitably resulting from the imperfections known to exist in all such machines.

It is to be emphasised that the term "alternating heat exchangers" as used herein is intended to include regenerators and reversible exchangers.

The invention as applied to air separation will now be described in further detail with reference to Figs. 1 and 2 of the accompanying drawings which show diagrammatically two methods of carrying the invention into effect. Like parts in all figures bear the same reference numerals.

As will be seen from the ensuing description, in each case the air is compressed, cooled in alternating heat exchangers conditioned to form a saturated vapour containing the major part of the oxygen and the vapour fed to a single rectifying column, at least a part of the separated nitrogen fraction being used for reboiling and reflux in the column.

In both of the figures regenerators are shown as the alternating heat exchangers for cooling the compressed air. In Figs. 1 and 2 a pair of associated regenerators bear the same reference numeral and the members of each pair are marked respectively by the suffix $a$ or $b$, the suffix $a$ being applied to the cooling regenerator and the suffix $b$ to the regenerator which is in course of being cooled. The direction of flow along the inter-connecting pipework is everywhere shown by arrows.

To avoid undue elaboration of the description several features for carrying the process into effect which are well-known to those skilled in the art have been omitted from the drawings. It will be appreciated, for example, that in practice there will have to be provision for removing residual traces of moisture and carbon dioxide from the cooled mixture emerging from the regenerators; that it is usually necessary to filter condensed gases before expansion; that vapours must be superheated before isentropic expansion; that the gas flows through a pair of associated regenerators must be balanced to ensure the attainment of the required thermal conditions and the complete removal of condensates. All such features are well-known and have been omitted in the interests of simplicity.

Referring specifically to Fig. 1, there is shown a circuit arrangement for separating a nitrogen fraction from air in which the conditioning of the compressed air emerging from the regenerators involves isentropic expansion.

In detail the air is compressed to about 2.0 atmospheres absolute and is cooled in regenerator $Ia$ to a temperature near its liquefaction point; after isentropic expansion to substantially atmospheric pressure in a turbine 10, the air is fed into a separation column 11 at an intermediate point. In the column 11 the air is separated into a gaseous nitrogen fraction and an oxygen fraction which are respectively withdrawn from the top and the base of the column; a part of the gaseous nitrogen fraction is warmed to substantially atmospheric temperature by passing successively through an undercooler 12 and regenerator $Ib$ while the remainder of the gaseous nitrogen fraction is warmed to substantially atmospheric temperature by passing successively through undercooler 12 and a further undercooler 13 and regenerator $5b$. The gaseous oxygen fraction is warmed to substantially atmospheric temperature by passing through regenerator $6b$. A proportion of the gaseous nitrogen fraction is re-cycled, being compressed to about 5.5 atmospheres absolute in a compressor 14 and cooled in regenerators $5a$ and $6a$, the combined streams being then liquefied by indirect heat exchange with the boiling oxygen fraction at the base of the separation column 11. The liquid nitrogen thus produced is passed successively through undercoolers 13 and 12 before being expanded into the top of the separation column where it serves as liquid reflux. For each of the pairs of regenerators $Ia$, $Ib$; $5a$, $5b$; $6a$, $6b$ suitable changeover valves $2$, $2'$; $3$, $3'$, $4$, $4'$ respectively, are provided at each end of the regenerators.

For the production of a gaseous nitrogen fraction containing 1% of oxygen and an oxygen fraction of 97% purity, 101 parts of air and 65 parts of nitrogen have to be compressed whereby 21 parts of the oxygen fraction are obtained. If the compressors have 72% adiabatic efficiency the power consumption per hour is 0.53 B. H. P. at the compressor shafts per cubic meter of 100% oxygen produced at a purity of 97%.

In the arrangement shown in Fig. 2, air is compressed to about 2.0 atmospheres absolute and is cooled in regenerator $Ia$ to a temperature near its liquefaction point. After isentropic expansion to substantially atmospheric pressure in a turbine 35, the air is fed into separation column 11 at an intermediate point. In the column 11 the air is separated into a gaseous nitrogen fraction and an oxygen fraction which are respectively withdrawn from the top and the base of the column. A part of the gaseous nitrogen fraction is warmed by passing it through an undercooler 36 and a part is then raised to substantially atmospheric temperature as a result of traversing regenerator $Ib$. The remainder of the nitrogen fraction emerging from the undercooler 36, after further slight warming in undercooler 37, is fed to a jet pump 38 wherein it is compressed to a sufficient pressure to allow it, while serving as boiling medium in column 11, to be condensed by indirect heat exchange with the boiling oxygen fraction therein. A part of the nitrogen stream leaving regenerator $Ib$ is compressed to a pressure of about 200 atmospheres in compressor 39 and cooled in heat exchanger 40 in indirect countercurrent contact with the oxygen fraction produced in column 11, whereby the oxygen fraction is warmed to substantially atmospheric temperature and at the same time the compressed nitrogen is cooled to the extent necessary to act as the motive fluid in the jet pump 38. As in the arrangement shown in Fig. 1, suitable change-over valves 2, 2' are provided at each end of the pair of regenerators $Ia$, $Ib$.

It will be understood the oxygen-enriched fraction produced by either of the methods above described may, if desired, be further separated to produce an argon-enriched fraction, substantially pure oxygen, and/or a fraction enriched in krypton and xenon.

We claim:

The method of producing substantially pure oxygen and substantially pure nitrogen from air which comprises compressing air to about 2.0 to about 2.6 atmospheres, cooling the said compressed air to near its liquefaction point in alternating heat exchangers by heat exchange with at least a part of the substantially pure nitrogen produced herein, converting the cooled compressed air to a saturated vapor by isentropic expansion to substantially atmospheric pressure, stripping liquid oxygen from the said saturated vapor by countercurrent contact in a single rectification column with a reflux medium derived from nitrogen produced herein while producing substantially pure nitrogen gas, recovering from said nitrogen gas the cold required for cooling the incoming compressed air, liquefying at least a part of said gaseous nitrogen by compression and transferring thereto cold from said liquid oxygen whereby said liquid oxygen is vaporized, expanding said liquefied nitrogen to substantially atmospheric pressure, and utilizing said expanded nitrogen as the main reflux medium for stripping liquid oxygen from the saturated vapor in said rectification column whereby substantially pure oxygen and substantially pure nitrogen are produced with a power consumption per hour of about 0.50 B. H. P. per cubic meter of said oxygen when the compressor has an adiabatic efficiency of about 72%.

PAUL MAURICE SCHUFTAN.
NEVILLE WYN ROBERTS.

REFERENCES CITED

The following references are of record in the file of this patent:

UNITED STATES PATENTS

| Number | Name | Date |
| --- | --- | --- |
| 1,864,585 | De Baufre | June 28, 1932 |
| 2,095,809 | Gomonet | Oct. 12, 1937 |
| 2,097,434 | De Baufre | Nov. 2, 1937 |
| 2,270,852 | Schuftan | Jan. 27, 1942 |
| 2,417,279 | Van Nuys | Mar. 11, 1947 |
| 2,496,380 | Crawford | Feb. 7, 1950 |